(12) United States Patent
Burtner et al.

(10) Patent No.: US 8,010,127 B2
(45) Date of Patent: Aug. 30, 2011

(54) SATELLITE AIDED LOCATION TRACKING AND DATA SERVICES USING GEOSYNCHRONOUS AND LOW EARTH ORBIT SATELLITES WITH GLOBAL LOCATING SYSTEM

(75) Inventors: Richard Burtner, Ashburn, VA (US); Abdul Rana, Great Falls, VA (US)

(73) Assignee: SkyBitz, Inc., Sterling, VA (US)

( * ) Notice: Subject to any disclaimer, the term of this patent is extended or adjusted under 35 U.S.C. 154(b) by 1086 days.

(21) Appl. No.: 11/696,707

(22) Filed: Apr. 4, 2007

(65) Prior Publication Data

US 2008/0233970 A1   Sep. 25, 2008

Related U.S. Application Data

(60) Provisional application No. 60/891,050, filed on Feb. 22, 2007.

(51) Int. Cl.
  *H04W 24/00* (2009.01)
  *H04W 40/00* (2009.01)
  *H04M 1/00* (2006.01)
(52) U.S. Cl. .................... 455/456.1; 455/552.1; 455/428
(58) Field of Classification Search ............... 455/456.1, 455/552.1, 428
See application file for complete search history.

(56) References Cited

U.S. PATENT DOCUMENTS

| | | |
|---|---|---|
| 5,638,399 A | 6/1997 | Schuchman et al. |
| 5,754,953 A | 5/1998 | Briancon et al. |
| 5,887,257 A | 3/1999 | Olds |
| 5,955,986 A | 9/1999 | Sullivan |
| 6,094,162 A | 7/2000 | Sullivan |
| 6,154,171 A | 11/2000 | Sullivan |
| 6,169,514 B1 | 1/2001 | Sullivan |
| 6,243,648 B1 | 6/2001 | Kilfeather et al. |
| 6,480,788 B2 | 11/2002 | Kilfeather et al. |
| 6,560,536 B1 | 5/2003 | Sullivan et al. |
| 6,725,158 B1 | 4/2004 | Kilfeather et al. |
| 2002/0137509 A1 * | 9/2002 | Laufer et al. ................ 455/427 |
| 2004/0157554 A1 | 8/2004 | Wesel |
| 2005/0261833 A1 * | 11/2005 | Brosius et al. ............... 701/213 |
| 2007/0184849 A1 * | 8/2007 | Zheng ....................... 455/456.1 |

FOREIGN PATENT DOCUMENTS

| | | |
|---|---|---|
| WO | WO 2006/064509 A2 | 6/2006 |
| WO | WO 2006064509 A2 * | 6/2006 |

\* cited by examiner

*Primary Examiner* — Marivelisse Santiago Cordero
*Assistant Examiner* — Omoniyi Obayanju
(74) *Attorney, Agent, or Firm* — Duane S. Kobayashi

(57) ABSTRACT

A system and method for satellite aided location tracking and data services using geosynchronous (GEO) and low earth orbit (LEO) satellites with global locating system. In one embodiment, a mobile terminal is designed for communication with both GEO and LEO satellites. This dual satellite functionality enables the asset tracking service to provide service across international service areas without hardware modification or reconfiguration of the mobile terminal device.

10 Claims, 3 Drawing Sheets

SATELLITE AIDED LOCATION TRACKING AND DATA SERVICES USING GEOSYNCHRONOUS AND LOW EARTH ORBIT SATELLITES WITH GLOBAL LOCATING SYSTEM

This application claims priority to provisional application No. 60/891,050, filed Feb. 22, 2007, which is incorporated by reference herein, in its entirety, for all purposes.

BACKGROUND

1. Field of the Invention

The present invention relates generally to monitoring and tracking and, more particularly, to a satellite aided location tracking and data services using geosynchronous (GEO) and low earth orbit (LEO) satellites with global locating system.

2. Introduction

Tracking mobile assets represents a growing enterprise as companies seek increased visibility into the status of movable assets (e.g., trailers, containers, etc.). Visibility into the status of movable assets can be gained through mobile terminals that are affixed to the assets. These mobile terminals can be designed to generate position information that can be used to update status reports that are provided to customer representatives.

Mobile terminals can report this position information to a centralized location via a wireless communication network such as a satellite communication network. In general, satellite communication networks provide excellent monitoring capabilities due to their wide-ranging coverage, which can span large sections of a continent. In providing an asset tracking service that can be applied to multiple international markets, it would be desirable to have a mobile terminal that is designed for flexible configuration. This flexible configuration would enable the mobile terminal to operate with various satellite communication systems in operation in the multiple international markets, thereby decreasing the time to market of such devices. What is needed therefore is a single mobile terminal design that enables a mobile terminal to operate with a plurality of distinct satellite communication networks.

SUMMARY

A system and method that enables satellite aided location tracking and data services using geosynchronous (GEO) and low earth orbit (LEO) satellites with global locating system, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
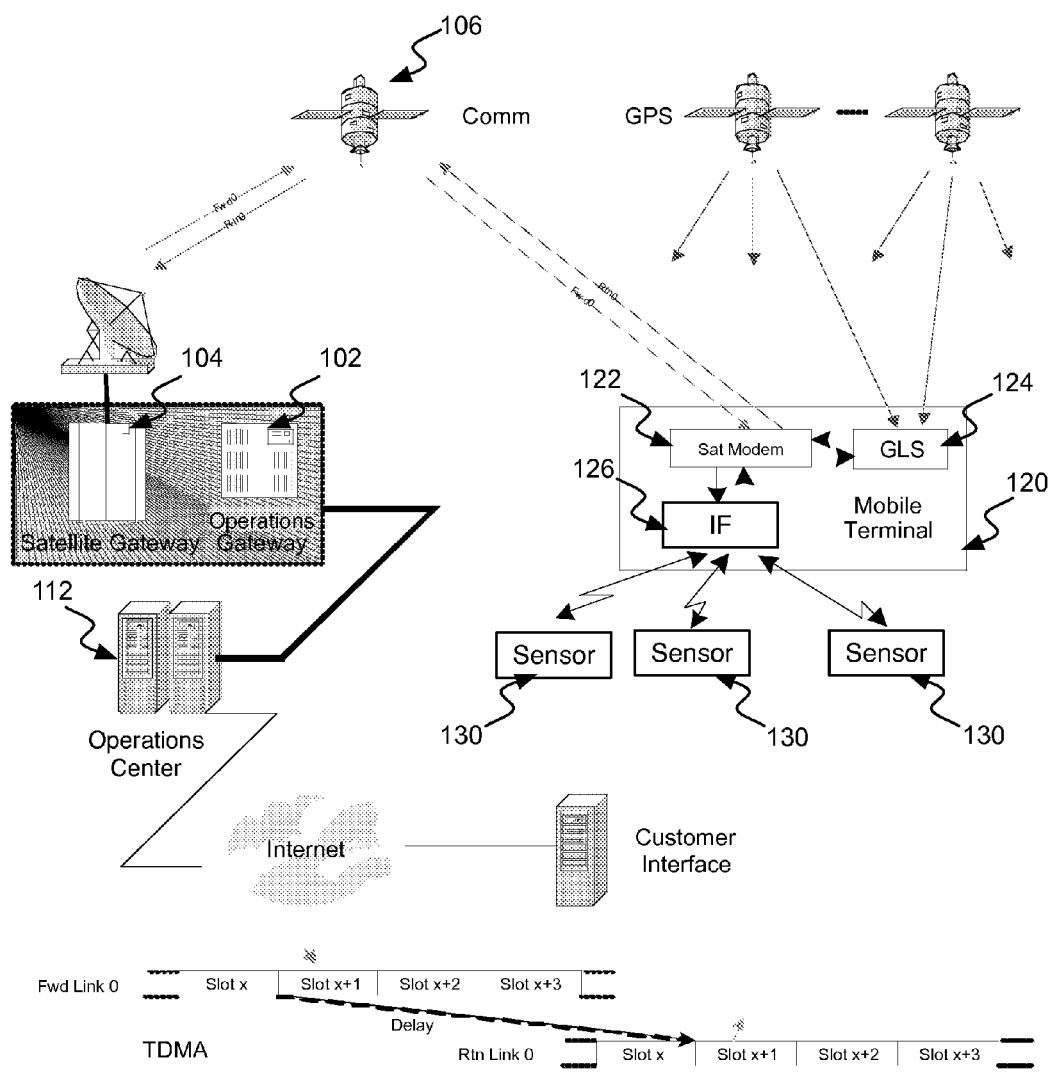
FIG. 1 illustrates an embodiment of a satellite network in communication with a mobile terminal on an asset.

FIG. 1 illustrates an embodiment of a asset tracking system that includes operations gateway 102, communicating with mobile terminal 120 on an asset. As would be appreciated, the asset can be embodied in various forms such as a trailer, a railcar, a shipping container, or the like.

Communication between operations gateway 102 and mobile terminal 120 is facilitated by satellite gateway 104 at the ground station and the specialized satellite modem 122 in mobile terminal 120. Both satellite gateway 104 and satellite modem 122 facilitate communication using one forward and one return link (frequency) over communications satellite 106.

In one embodiment, the satellite communication is implemented in a time division multiple access (TDMA) structure, which consists of 57600 time slots each day, per frequency or link, where each slot is 1.5 seconds long. On the forward link, operations gateway 102 sends a message or packet to mobile terminal 120 on one of the 1.5 second slots. Upon receipt of this message or packet, mobile terminal 120 would then perform a GPS collection (e.g., code phase measurements) using global locating system (GLS) module 124 or to perform sensor measurements and transmit the data back to operations gateway 102 on the return link, on the same slot, delayed by a fixed time defined by the network. In one embodiment, the fixed delay defines a length of time that enables mobile terminal 120 to decode the forward packet, perform the data collection and processing, and build and transmit the return packet.

In one embodiment, mobile terminal 120 can be configured to produce periodic status reports. In this configuration, mobile terminal 120 would wake up periodically, search for its assigned forward slot, perform data collection and processing, and transmit the status report on the assigned return slot. In another embodiment, mobile terminal 120 can be configured to produce a status report upon an occurrence of an event (e.g., door opening, motion detected, sensor reading, etc.). In this configuration, mobile terminal 120 would wake up upon occurrence of an event, search for an available forward slot, perform data collection and processing, and transmit the status report on the return slot corresponding to the identified available forward slot.

Upon receipt of a status report from mobile terminal 120, operations gateway 102 passes the information to operations center 112. Operations center 112 can then use the received GPS collection to calculate a position solution. This position solution along with any other status information (both current and historical) can be passed to a customer via the Internet. A detailed description of this communications process is provided in U.S. Pat. No. 6,725,158, entitled "System and Method for Fast Acquisition Position Reporting Using Communication Satellite Range Measurement," which is incorporated herein by reference in its entirety.

As FIG. 1 further illustrates, mobile terminal 120 can also collect sensor measurements from sensors 130 that are positioned at various points on the asset being tracked. In meeting the demand by customers for greater visibility into the status of assets, various sensor types can be used. For example, volume sensors, temperature sensors, chemical sensors, radiation sensors, weight sensors, light sensors, water sensors, etc. can be used to report the condition of cargo being transported or an environment of the asset. In another example, truck cab ID indicators, odometer sensors, wheel sensors, vibration sensors, etc. can be used to report the condition of the service vehicle. In general, these various sensors can be used to report status information or the occurrence of any events at the service vehicle to the mobile terminal for transmission to the centralized facility. The position information along with any sensor information can then be reported to the centralized facility periodically, upon request, or upon an occurrence of a detected event at the asset location.

As illustrated in FIG. 1, the transmission of sensor information from sensors 130 to mobile terminal 120 can be facilitated by interface 126. In various embodiments, interface 126 can facilitate connection of mobile terminal 120 to sensors 130 via wired or wireless connections.

As illustrated in FIG. 1, reports are sent from a mobile terminal to a centralized facility via a communication satellite. In one embodiment, the communication satellite is a geosynchronous or geostationary (GEO) satellite that is positioned a fixed point at approximately 22,000 miles above the earth's surface. At this fixed height, the GEO satellite matches the Earth's rotation speed and is therefore in a fixed position in space in relation to the earth's surface. The satellite goes around once in its orbit for every rotation of the earth.

While a single GEO satellite can cover as much as 40 percent of the earth's surface, a GEO satellite can typically be configured to focus its transmission and increase its signal strength over a defined service area. These large service areas can still dictate that a mobile terminal is configured to communicate with a single GEO satellite.

In providing mobile terminal tracking and data services to customers that span international boundaries, the design of a mobile terminal for operation solely with GEO satellites can lead to competitive disadvantages. For example, mobile terminal tracking and data services in a different GEO communication satellite service area would often require the negotiation of agreements with different communication satellite service providers. These international negotiations can unnecessarily hinder or delay the introduction of mobile terminal services across an entire international marketplace.

In accordance with the present invention, the mobile terminal can be designed to communicate with multiple satellite communication networks, thereby increasing its flexibility in communicating in different international service areas. In one embodiment, a hybrid mobile terminal is provided that also includes the capability to communicate with low earth orbit (LEO) satellites. In general, LEO satellites orbit the earth at an orbit below the GEO satellite orbit and are not fixed in space in relation to the rotation of the earth. LEO satellites can move at very high speeds such that a LEO satellite can go across the visible horizon in a short period of time (e.g., approximately 10 minutes). When the first LEO satellite moves out to the horizon, another LEO satellite becomes available for communication. Because of the low orbit, the mobile terminal transmitter does not have to be as powerful as compared to transmitting to GEO satellites.

Figure 2:
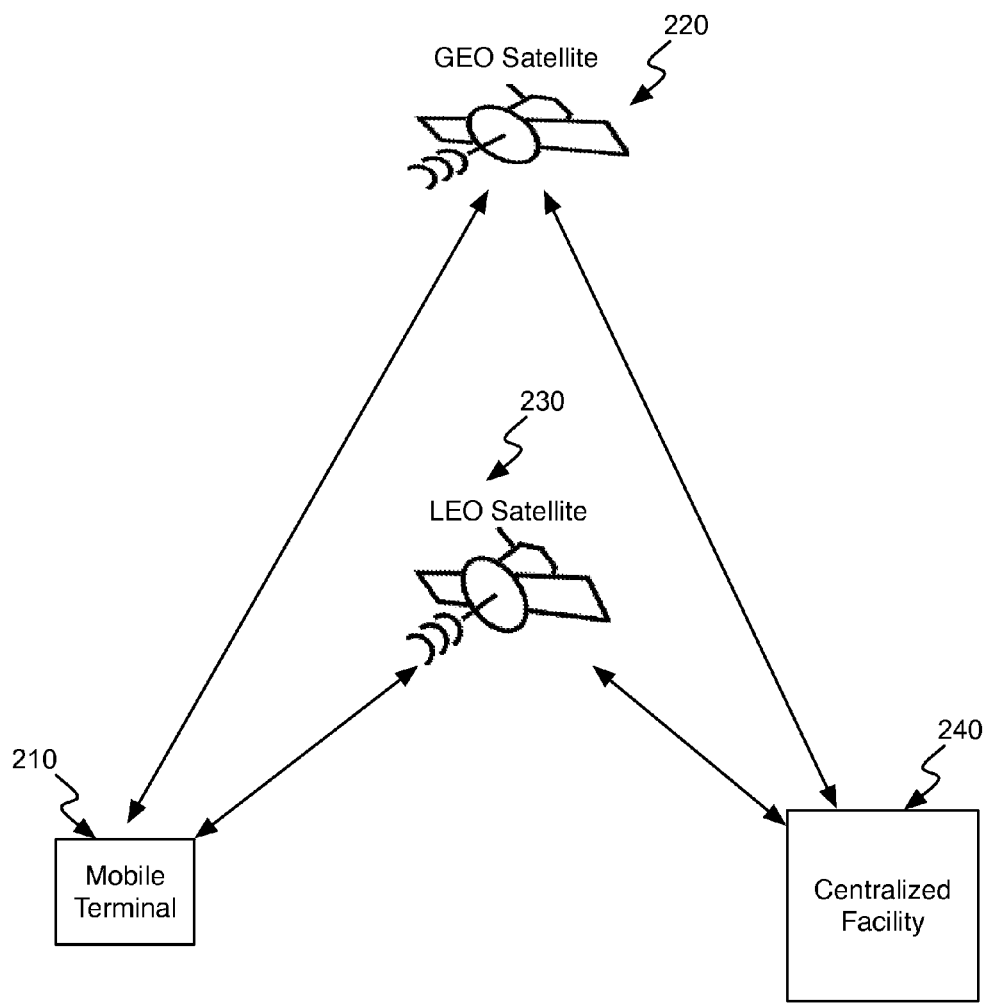
FIG. 2 illustrates an embodiment of a mobile terminal in communication with multiple satellite networks.

FIG. 2 illustrates a mobile terminal that is designed for communication with multiple satellite communication networks. As illustrated, mobile terminal 210 can communicate with centralized facility via either GEO satellite 220 or LEO satellite 230. It is a feature of the present invention that the inclusion of LEO satellite communication functionality into a mobile terminal along with GEO satellite communication functionality enables the asset tracking service provider to provide service across international service areas without hardware modification or reconfiguration of the mobile terminal device. This results since the mobile terminal can be flexibly configured to operate in various modes.

In one operation mode, the mobile terminal can be configured to operate solely with a GEO satellite. For example, this operation mode can be selected for a mobile terminal when a suitable GEO satellite service provider is available for a particular service area in which the mobile terminal will be employed. In another operation mode, the mobile terminal can be configured to operate solely with a LEO satellite. For example, this operation mode can be selected for a mobile terminal when a suitable LEO satellite service provider is available for all service areas. In yet another operation mode, the mobile terminal can be configured to operate in a hybrid mode where both GEO and LEO satellites are used. For example, this hybrid operation mode can be selected where mobile terminals receive configuration information or reference information (e.g., pilot signal) via a GEO satellite, but transmit position information and/or sensor information to a centralized facility via a LEO satellite. In one scenario, this hybrid operation mode can be selected where the cost of transmission over a LEO satellite is lower than a GEO satellite, or the communications performance on the LEO satellite is better than on the GEO satellite.

In general, the flexibility in selection of mobile terminal operating mode enables a single mobile terminal hardware design to be applied across all international service areas. In other words, the mobile terminal hardware design would not be dictated by the ability of the asset tracking service provider to negotiate suitable agreements with the particular satellite service providers that serve a particular service area. Significantly, a feature of the present invention is that it obviates the need to negotiate new agreements with additional GEO satellite service providers prior to entry into a new market.

Asset tracking service providers are then given the flexibility to rapidly introduce new service offerings to international customers. In one example, new service agreements completed after deployment of the mobile terminal can still be accommodated through the reconfiguration of the mobile terminal to operate in a different mode. As would be appreciated, reconfiguration could enable the mobile terminal to switch between GEO only, LEO only, or hybrid GEO/LEO modes.

Figure 3:
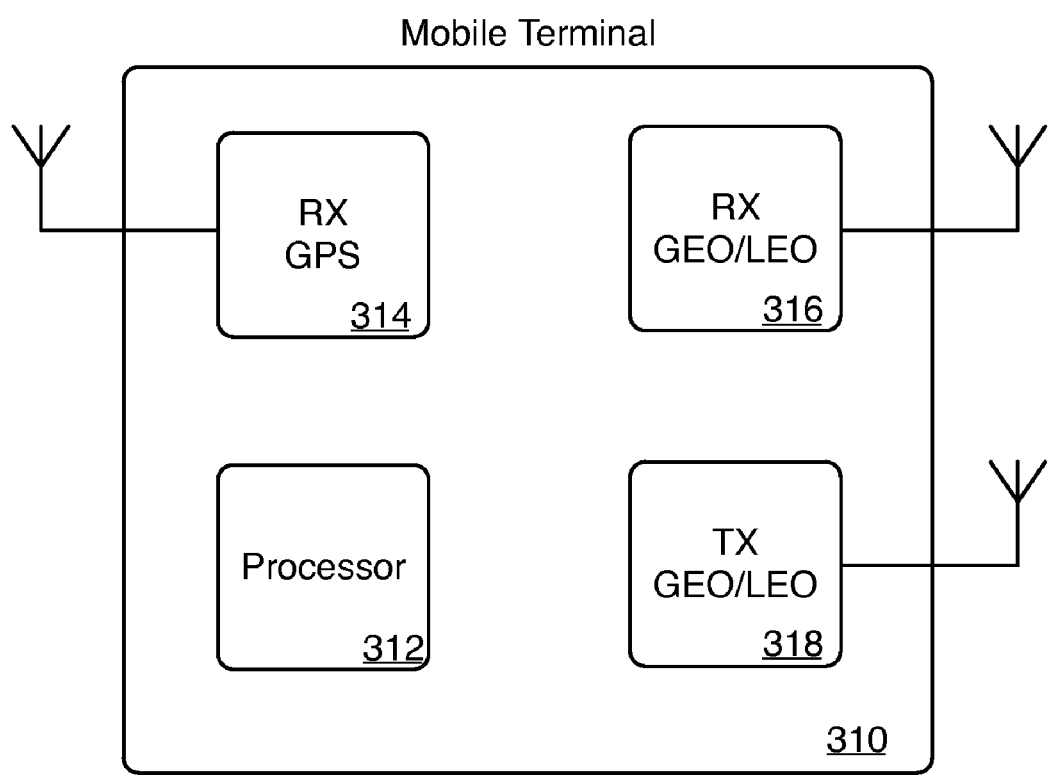
FIG. 3 illustrates an embodiment of a mobile terminal.

As noted above, a hybrid mobile terminal device that enables communication with either a GEO satellite system or a LEO satellite system enables flexibility in provisioning and potential reduction in costs. FIG. 3 illustrates an embodiment of a mobile terminal that is designed to communicate with both a GEO satellite system and a LEO satellite system. As illustrated, mobile terminal 310 includes processor 312 that is operative to control various transmit and receive modules. In one embodiment, mobile terminal 310 includes one transmit module 318 and two receive modules 314 and 316.

Receive module 314 is designed to receive GPS satellite signals that are used to generate position information, while receive module 316 is an integrated module that is designed to receive GEO and LEO satellite signals. Transmit module 318 is also an integrated module that is designed to transmit to either a GEO satellite or a LEO satellite. In one embodiment, modules 316 and/or 318 are separated into two distinct modules that are dedicated to one of GEO and LEO operation.

In the illustration of FIG. 3, each of the modules is shown as being coupled to a separate antenna. As would be appreciated, modules can also be designed to share an antenna.

With this configuration, the mobile terminal can be configured in multiple operation modes as described above. In a GEO mode, receive module 316 and transmit module 318 (with GEO) would be used for GEO transmitting and receiving, respectively. In a LEO mode, receive module 316 and transmit module 318 could be used for LEO transmitting and receiving, respectively. Finally, in a hybrid mode, receive module 316 and transmit module 318 (with LEO) could be used for GEO receiving and LEO transmitting, respectively. In this mode, the GEO receiving can enable configuration or reference information to be received by the mobile terminal.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A mobile terminal, comprising:
   a global positioning system receiver for receiving signals from a plurality of global positioning system satellites;
   a first communication module that enables communication by the mobile terminal with a geosynchronous satellite;
   a second communication module that enables communication by the mobile terminal with a low earth orbit satellite; and
   a processor that controls a relative operation of said first and second communication modules, said control by said processor including a selected operation of one of said first and second communication modules based on an identification of one of a plurality of potential international service areas in which the mobile terminal is operating, said control by said processor occurring at a time proximate to a first time activation of the mobile terminal,
   wherein upon selection of one of said first and second communication modules, said selected communication module is used to transmit measurements of said received global positioning system satellite signals and sensor information generated by one or more sensors coupled to the mobile terminal to a centralized location via a chosen satellite service provider operating in said identified international service area.

2. The mobile terminal of claim 1, wherein said first communication module receives configuration information from said geosynchronous satellite.

3. The mobile terminal of claim 2, wherein said first communication module receives reference information in a pilot signal from said geosynchronous satellite.

4. The mobile terminal of claim 1, wherein said second communication module receives configuration information from said low earth orbit satellite.

5. The mobile terminal of claim 4, wherein said second communication module receives reference information from said low earth orbit satellite.

6. A mobile terminal, comprising:
   a global positioning system receiver for receiving signals from a plurality of global positioning system satellites;
   a first communication module that enables communication by the mobile terminal with a geosynchronous satellite;
   a second communication module that enables communication by the mobile terminal with a low earth orbit satellite; and
   a processor that controls a relative operation of said first and second communication modules, said control by said processor including a selected operation of one of said first and second communication modules based on an identification of one of a plurality of potential international service areas in which the mobile terminal is operating, said control by said processor occurring in a reconfiguration process after a first time activation of the mobile terminal,
   wherein upon selection of one of said first and second communication modules, said selected communication module is used to transmit measurements of said received global positioning system satellite signals and sensor information generated by one or more sensors coupled to the mobile terminal to a centralized location via a chosen satellite service provider operating in said identified international service area.

7. The mobile terminal of claim 6, wherein said first communication module receives configuration information from said geosynchronous satellite.

8. The mobile terminal of claim 7, wherein said first communication module receives reference information in a pilot signal from said geosynchronous satellite.

9. The mobile terminal of claim 6, wherein said second communication module receives configuration information from said low earth orbit satellite.

10. The mobile terminal of claim 9, wherein said second communication module receives reference information from said low earth orbit satellite.

* * * * *